3,706,782
ESTERS OF p-BIPHENYLYLACETIC ACID WITH POLYHYDRIC ALCOHOLS
Oliver Stephenson, Anthony Musgrave Wild, and David Frank Hayman, London, England, assignors to BDH Pharmaceuticals Limited, London, England
No Drawing. Filed July 8, 1970, Ser. No. 53,330
Claims priority, application Great Britain, July 9, 1969, 34,534/69
Int. Cl. C07c 69/76
U.S. Cl. 260—469
5 Claims

ABSTRACT OF THE DISCLOSURE

Esters of p-biphenylylacetic acid with polyhydric alcohols, for example, glyceryl-α-(p-biphenylyl) acetate, having utility as anti-inflammatory agents.

---

This invention relates to organic compounds and has particular reference to esters of p-biphenylylacetic acid with polyhydric alcohols.

We have made the discovery that these compounds possess noteworthy anti-inflammatory activity and, compared with the parent acid, they possess the additional advantages that they are neutral compounds which possess increased water-solubility. These factors make them suitable for oral administration.

Thus, for example, glyceryl-α-(p-biphenylyl)acetate (I; X=H, Y=OH) was active in the rat-paw carrageenin assay and in the standard guinea pig UV erythema assay. In the erythema assay on oral administration it was shown to possess an anti-inflammatory activity approximately 6 times greater than phenylbutazone used as standard. It had an $LD_{50}$ of greater than 1600 mg./kg. (in mice) and is consequently an anti-inflammatory agent of great potential utility.

It is an object of this invention to provide new water-soluble esters of p-biphenylylacetic acid having the general Formula I below (where X and Y are as hereinunder defined).

It is another object of the present invention to provide a process for the preparation of these water-soluble esters of p-biphenylylacetic acid of general Formula I below. It will be obvious to those skilled in the art that glyceryl-α-(p-biphenylyl)acetate (I; X=H, Y=OH) can exist in optically active forms. This invention covers the optically active forms as well as racemic mixtures.

It is yet another object of this invention to provide pharmaceutical compositions of the anti-inflammatory products of the present invention in admixture with one or more solid or liquid pharmaceutically acceptable inert carriers.

The process used for the preparation of the compounds of the invention is essentially that described by Hilditch and Rigg (J. Chem. Soc., 1935, 1774) whereby α-monoglycerides are readily obtained by heating the appropriate acid with glycerol and phenol (or cresol) in the presence of camphor β-sulphonic acid as catalyst.

According to the present invention therefore there is provided a process for the preparation of esters of p-biphenylylacetic acid having the general formula $$\underset{Y}{\underset{|}{\bigcirc\!\!-\!\!\bigcirc}\!\!-\!\!CH_2.CO.O.CH_2.\overset{X}{\underset{|}{C}}.CH_2OH} \quad (I)$$

where X is hydrogen, methyl, ethyl or hydroxymethyl and Y is hydroxyl or hydroxymethyl, but when X is hydrogen, Y may be hydroxyl but not hydroxymethyl which process comprises heating p-biphenylylacetic acid with a polyhydric alcohol having the formula $$HOCH_2.\overset{X}{\underset{\underset{Y}{|}}{C}}.CH_2OH \quad (II)$$

where X and Y have the same meaning as above.

Thus p-biphenylylacetic acid may be heated with the polyhydric alcohol, for example, glycerol, 1,1,1-trishydroxymethyl ethane, 1,1,1-trishydroxymethyl propane or pentaerythritol.

The reaction may be carried out in the presence of an added solvent which promotes the miscibility of p-biphenylylacetic acid and the polyhydric alcohol. Thus the reaction may be carried out in the presence of a monohydric phenol for example phenol or cresol or in dioxan.

If desired catalytic quantities of an acid such for example as hydrochloric acid may be added to the reaction mixture.

The reaction temperature is preferably in the range 100–220° C. and the reaction time preferably from 2 to 6 hours.

The phenolic component, if present, may be removed by distillation in steam or at reduced pressure.

The product may be extracted with a suitable solvent, for example, ethyl acetate, ether, carbon tetrachloride or methylene dichloride and the extract may be washed with dilute aqueous potassium carbonate solution if necessary to remove any unchanged p-biphenylylacetic acid.

The extract may then be washed with water, dried and the solvent distilled off to yield the required ester which may be purified by crystallisation from a suitable solvent or solvent mixture.

Following is a description by way of example of methods of carrying the invention into effect.

EXAMPLE 1

Glyceryl-α-(p-biphenylyl)acetate

A mixture of p-biphenylylacetic acid (10.6 g.), glycerol (10 g.) and phenol (10 g.) was heated under an air condenser, at atmospheric pressure (reflux temperature 210° C.) for 4 hours. Water formed during the esterification was allowed to boil off. After 4 hours the mixture was distilled in steam to remove phenol. The residual mixture was cooled and extracted with ether. The ethereal extract was dried with anhydrous sodium sulphate and the ether removed by distillation. The residual solid was purified by crystallisation from carbon tetrachloride to give the ester (62% yield), M.P. 111° C.

EXAMPLE 2

Glyceryl-α-(p-biphenylyl)acetate

The reaction described in Example 1 was repeated and when the mixture had been refluxed for 4 hours, the phenol was removed by distillation at reduced pressure (0.5 mm.) (bath temperature 100° C.). The mixture was then poured into water and the product isolated as described in Example 1. It (70% yield) had M.P. 111° C.

EXAMPLE 3

1,1,1-trishydroxymethyl ethane mono-(p-biphenylyl)acetate

A mixture of p-biphenylylacetic acid (10.6 g.), 1,1,1-trishydroxymethyl ethane (15.9 g.) and phenol (10 g.) was heated at reflux temperature (ca. 210° C.) for 4 hours and water formed during the reaction was allowed to boil off freely. The mixture was cooled, poured into water (400 ml.) and the mixture boiled in an open vessel to remove phenol. It was then cooled and the oil isolated with ether. The ether extracts were dried with anhydrous sodium sulphate and the ether distilled off. The residual solid was crystallised from carbon tetrachloride to yield the required ester (6.8 g.), M.P. 85–86° C.

EXAMPLE 4

1,1,1-trishydroxymethyl propane mono-(p-biphenylyl)acetate

This compound was prepared exactly as described in Example 3 but using 1,1,1-trishydroxymethyl propane (16.5 g.) in place of 1,1,1-trishydroxymethyl ethane.

It was purified by crystallisation from carbon tetrachloride.

EXAMPLE 5

Pentaerythritol mono-(p-biphenylyl)acetate

A mixture of p-biphenylylacetic acid (2.65 g.), pentaerythritol (3.75 g.) and phenol (5 g.) was heated at 200–205° C. for 4 hours. The phenol was distilled off at reduced pressure (0.50 mm.) and the residual syrup was partitioned between 2% sodium bicarbonate solution (50 ml.) and ethyl acetate (50 ml.). The organic phase was separated, dried with anhydrous sodium sulphate and evaporated to yield a slightly viscous solid (4.0 g.). This was crystallised from a mixture of carbon tetrachloride and ethyl acetate to yield the ester as a somewhat waxy solid, M.P. 110–115° C.

EXAMPLE 6

Glyceryl α-(p-biphenylylacetate)

A mixture of p-biphenylylacetic acid (100 g.) and glycerol (400 ml.) was heated to 200° C. for 4 hours, and water formed during the esterification was allowed to boil off. The mixture was cooled slightly, poured into water, and the warm suspension of ester extracted with ethyl acetate (1 litre). The warm ethyl acetate layer was washed with water to remove any glycerol and dried with anhydrous magnesium sulphate. It was then concentrated and the ester allowed to crystallise. This was collected and crystallised twice further from ethyl acetate (6 volumes) to yield the product (63%), M.P. 117–119° C.

EXAMPLE 7

Glyceryl α-(p-biphenylylacetate)

A mixture of p-biphenylylacetic acid (100 g.), glycerol (400 ml.) and concentrated hydrochloric acid (1 ml.) was heated at 180° C. for 2.5 hours. The reaction mixture was cooled, poured into water (1.5 litres) and the solid collected. This was dissolved in toluene (1.5 litres) at 80–90° C., the water layer was removed and the toluene layer was cooled to 35° C. and the product collected. This was crystallised from 50% methanol and then from ethyl acetate to yield the product (65% yield), M.P. 117–119° C.

EXAMPLE 8

Glyceryl α-(p-biphenylylacetate)

A mixture of p-biphenylylacetic acid (125 g.), glycerol (500 ml.), dioxan (125 ml.) and concentrated hydrochloric acid (1.2 ml.) was heated at 100° C. for 6 hours. The mixture was poured into water (1 litre) containing methanol (250 ml.). The solid was collected and crystallised from 50% methanol and then from ethyl acetate to yield the product (57%), M.P. 118–119° C.

EXAMPLE 9

Glyceryl α-(p-biphenylylacetate)

A mixture of p-biphenylylacetic acid (125 g.), glycerol (500 ml.), dioxan (125 ml.) and concentrated hydrochloric acid (1.2 ml.), was heated at 100° C. for 6 hours and poured into water (1 litre). It was then extracted with ethyl acetate at 30–40° C. and the extract washed with two 400 ml. portions of water at 35° C. The extract was then dried with anhydrous magnesium sulphate and concentrated to a volume of 750 ml. The product separated on cooling and had M.P. 116–118° C. (yield, 103 g.; 72%). Recrystallisation from toluene containing ethyl acetate (10%) furnished pure material (96 g.), M.P. 118–119° C.

We claim:
1. Water soluble esters of p-biphenylylacetic acid having the general formula

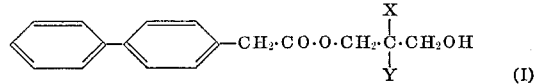

(I)

where X is hydrogen, methyl, ethyl or hydroxymethyl and Y is hydroxyl or hydroxymethyl but when X is hydrogen, Y may be hydroxyl but not hydroxymethyl.

2. Glyceryl-α-(p-biphenylyl) acetate.
3. 1,1,1-trishydroxymethyl ethane mono (p-biphenylyl) acetate.
4. 1,1,1-trishydroxymethyl propane mono-(p-biphenylyl)acetate.
5. Pentaerythritol mono-(p-biphenylyl) acetate.

References Cited

UNITED STATES PATENTS 2,410,040  10/1946  Blicke _____ 260—469

OTHER REFERENCES

Groggins, editor, "Unit Processes in Organic Synthesis," 5th ed., 1958, pp. 694–702.

LORRAINE A. WEINBERGER, Primary Examiner

R. S. WEISSBERG, Assistant Examiner

U.S. Cl. X.R.

424—308